United States Patent [19]
Durkee

[11] Patent Number: 5,856,953
[45] Date of Patent: Jan. 5, 1999

[54] PROCESSING ECHOES IN ULTRASONIC LIQUID GAUGING SYSTEMS

[75] Inventor: Scott R. Durkee, New Haven, Vt.

[73] Assignee: Simmonds Precision Products, Inc., Akron, Ohio

[21] Appl. No.: 757,199

[22] Filed: Nov. 27, 1996

[51] Int. Cl.⁶ .......................... G01F 23/296; G01F 23/28
[52] U.S. Cl. .......................... 367/99; 367/908; 73/290 V
[58] Field of Search .................... 367/908, 99; 73/290 V

[56] References Cited

U.S. PATENT DOCUMENTS

| | | | |
|---|---|---|---|
| 4,210,969 | 7/1980 | Massa | 367/908 |
| 4,470,299 | 9/1984 | Soltz | 73/290 V |
| 5,085,077 | 2/1992 | Stapleton et al. | 73/290 V |
| 5,226,320 | 7/1993 | Dages et al. | 73/290 V |
| 5,309,763 | 5/1994 | Sinclair | 367/99 |

FOREIGN PATENT DOCUMENTS

| | | |
|---|---|---|
| 0 138 541 A | 4/1985 | European Pat. Off. . |
| 37 14 520 A | 11/1988 | Germany . |
| 42 04 414 C | 3/1993 | Germany . |
| 8-2199854A | 8/1996 | Japan . |
| WO 96 24027 A | 8/1996 | WIPO . |

*Primary Examiner*—Ian J. Lobo
*Attorney, Agent, or Firm*—William E. Zitelli; Leonard L. Lewis

[57] ABSTRACT

Method for processing echoes received in an ultrasonic liquid gauging apparatus includes the steps of transmitting at time $t_1$ ultrasonic energy from an ultrasonic transducer toward a fixed target and a liquid surface; producing a transmission pulse corresponding to the time $t_1$; receiving during a predetermined cycle interval a number (i) of ultrasonic echoes after $t_1$ and converting each echo into a corresponding echo pulse having an associated time of arrival $t_{i+1}$; and calculating the liquid level based on an averaged time of arrival of the second echo relative to $t_1$ when it is known that the liquid surface is low.

13 Claims, 5 Drawing Sheets

PROCESSING ECHOES IN ULTRASONIC LIQUID GAUGING SYSTEMS

BACKGROUND OF THE INVENTION

The invention is generally related to ultrasonic liquid gauging systems. More particularly, the invention is related to improving the detection of valid echoes under low liquid level and echo drop out conditions to thereby improve the accuracy of the measured liquid quantity.

Ultrasonic liquid gauging systems are well known in the art, and have been used, for example, in aircraft fuel gauging systems. Such systems typically operate based on echo ranging, by which the elapsed time between the transmission of ultrasonic energy from an ultrasonic transducer and the detection of ultrasonic echoes can be used to determine the distance of the reflecting surface to the ultrasonic transducer. Such reflections occur at boundaries that define impedance mismatches between the liquid and another surface or object. A velocity of sound (VOS) target can be used that is positioned a predetermined distance from the transducer to provide a reference value for the VOS through the liquid to improve the accuracy of the calculated distances of the liquid surface from the transducer.

For low liquid levels, a particular problem that can arise is the detection of secondary and tertiary echoes from multiple or harmonic reflections at the liquid surface of the transmitted ultrasonic energy. Echoes can also be lost or missed, including echoes from the surface as well as from the target.

The objectives exist, therefore, to provide improved processing of echo data in ultrasonic liquid gauging systems.

SUMMARY OF THE INVENTION

The present invention contemplates, in one embodiment, a method for processing echoes received in an ultrasonic liquid gauging apparatus, the method comprising the steps of:

a) transmitting at time $t_1$ ultrasonic energy from an ultrasonic transducer toward a fixed target and a liquid surface;

b) producing a transmission pulse corresponding to the time $t_1$;

c) receiving during a predetermined cycle interval a number (i) of ultrasonic echoes after $t_1$ and converting each echo into a corresponding echo pulse having an associated time of arrival $t_{i+1}$; and d) calculating the liquid level based on an averaged time of arrival of the second echo relative to $t_1$ when it is known that the liquid surface is low.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
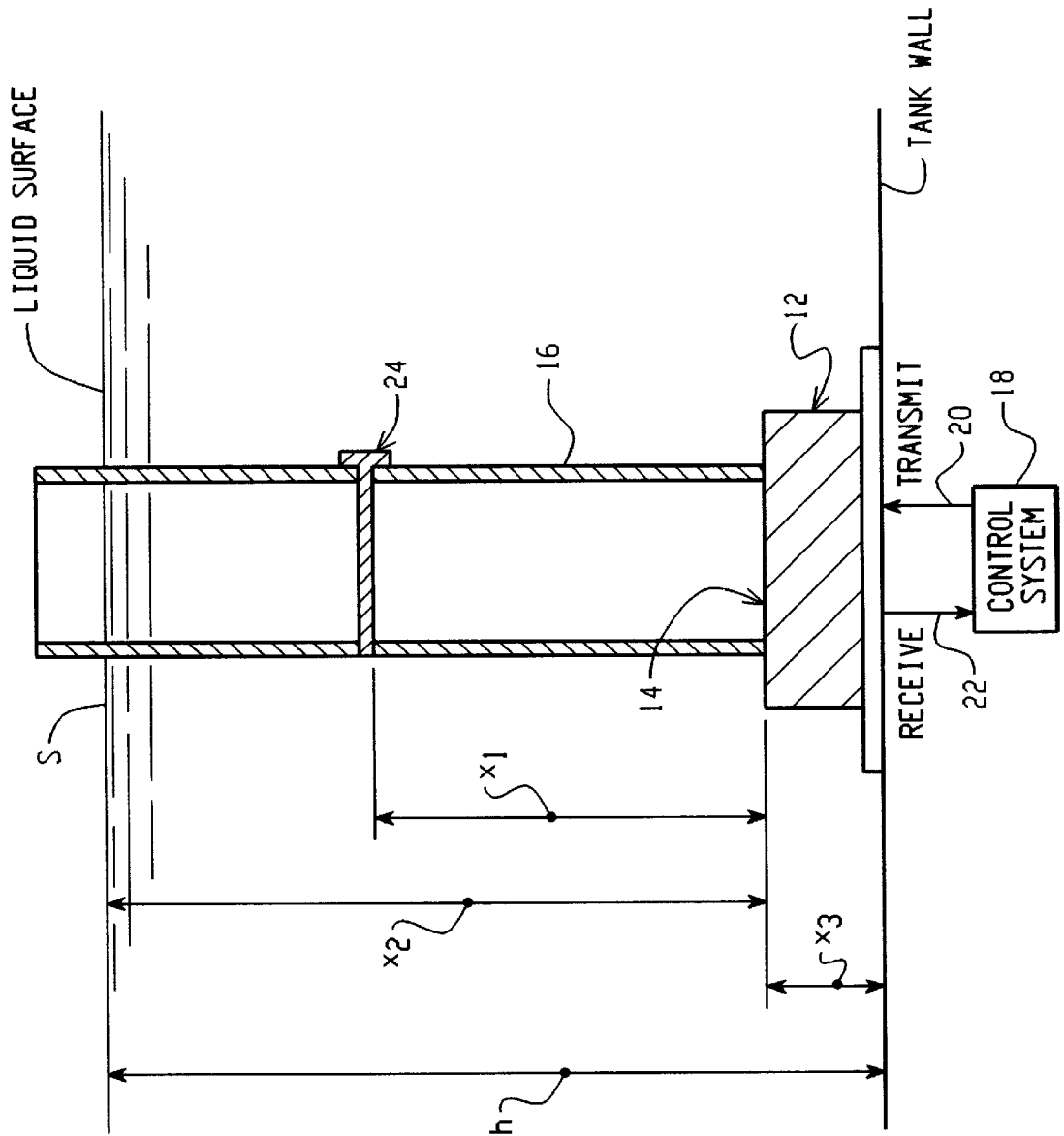
FIG. 1 is a simplified schematic of a typical liquid gauging system used with the present invention.

With reference to FIG. 1, an embodiment of the invention is illustrated in simplified schematic form for purposes of describing the basic concepts of the invention. In this basic configuration, a typical ultrasonic gauging system 10 is illustrated in FIG. 1 and includes an ultrasonic transducer 12 having a transducer face 14 that is oriented towards the liquid surface S. An optional stillwell 16 may be used to confine the ultrasonic energy along a well defined transmission path and also to reduce the effects of sloshing and fuel aeration. A control system 18, typically part of an overall fuel gauging system, is used to provide an excitation or transmit signal 20 to the transducer so that an ultrasonic pulse or pulses are transmitted from the transducer face 14 towards the liquid surface S.

The transducer 12 also typically functions as an ultrasonic receiver and converts ultrasonic energy that impinges on the face of the transducer into a corresponding electrical receive signal 22. Such ultrasonic echo energy may arise, for example, from reflections of the transmitted energy by the liquid surface S as well as a VOS target 24 that is positioned a known distance from the transducer face 14. Reflected energy from the target 24 can be used to determine the velocity of sound (hereinafter VOS), by measuring the elapsed time between the transmission of ultrasonic energy towards the target 24 and the detection of the echo produced by energy reflected by the target 24 back to the transducer 12.

When the ultrasonic transducer 12 is excited it launches a sound pressure wave, for example at a typical frequency of 1 MHz, of a predetermined number of sinusoidal cycles into the liquid. This sound wave travels at the speed of sound for the given liquid and temperature until it is reflected back towards the transducer by an impedance mismatch. In the probe illustrated in FIG. 1, a reflection occurs at the liquid surface S and at the metal cylindrical VOS target pin 24 (when the liquid surface S is above the target 24). Since the distance from the transducer face 14 to the bottom of the VOS pin, $X_1$, is known and the liquid is assumed to be non-stratified with respect to temperature, the distance to the liquid surface S from the transducer face 14 is given as:

$$X_2 = X_1(t_3-t_1)/(t_2-t_1) \qquad \text{Eqn. 1}$$

The times $t_1$, $t_2$, $t_3$, can be measured by a digital counter in the control system based on the leading edges of the transmit pulse and the received echoes. Since the electronics must be able to compensate for propagation delay errors, the electronic counter in the control system is initiated before the excitation of the transducer to launch a 1 MHz burst. In this way, the leading edge of the transmit pulse, the VOS echo pulse and the fuel surface echoes are captured and the digitized leading edge of the transmit pulse becomes the reference point from which the other two counts are subtracted. Thus, at this point the following parameters can be defined:

$$\text{VOS cnt} = t_2 - t_1 \qquad \text{Eqn. 2}$$

$$\text{Surface cnt} = t_3 - t_1 \qquad \text{Eqn. 3}$$

so that $X_2 = X_1 *(\text{Surface cnt})/(\text{VOS cnt})$. The measured times $t_1$, $t_2$, $t_3$ can be further compensated as required to account for propagation delays through the transducer itself.

For low liquid levels below the VOS target, VOS target echoes are not received and default values for VOS can be used.

Figure 2:
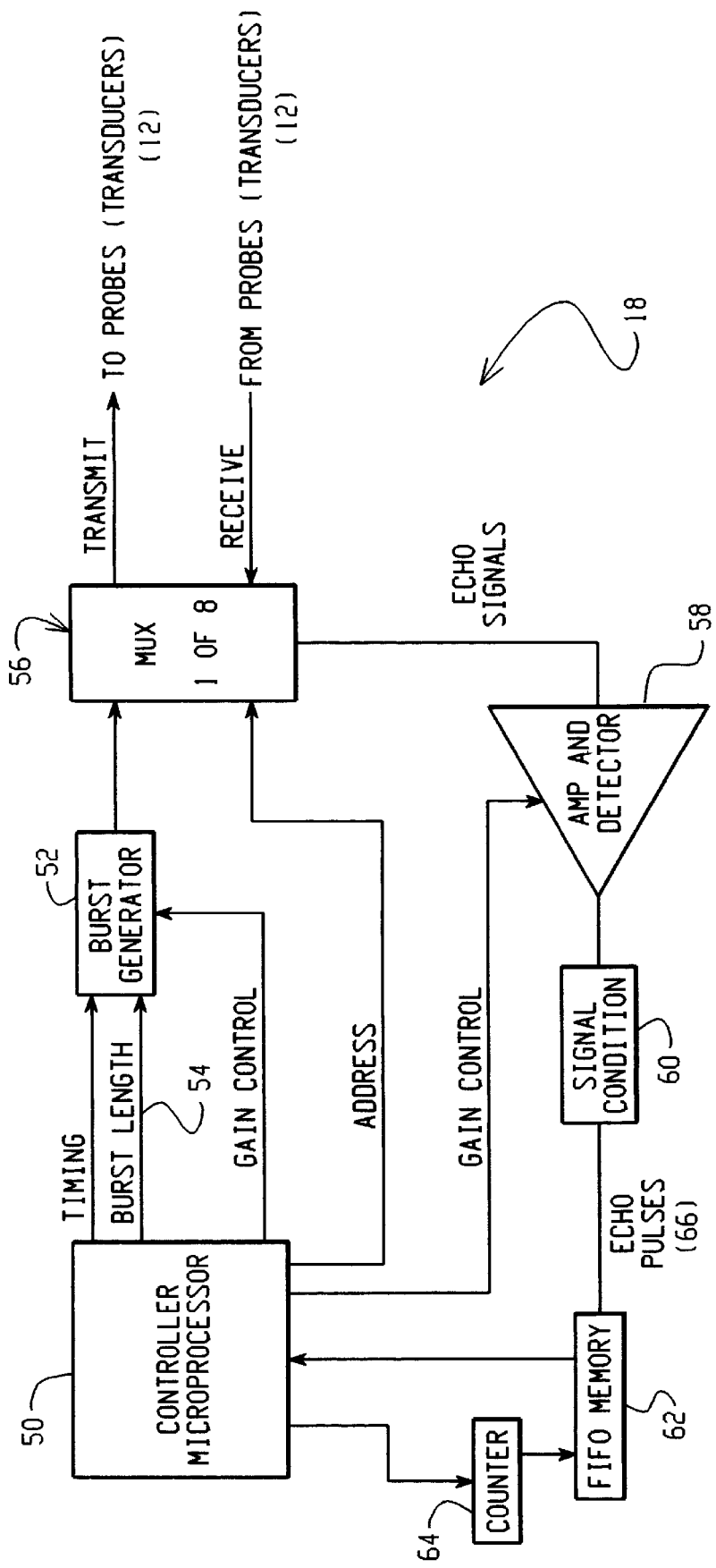
FIG. 2 is a functional block diagram of a suitable control circuit that can be used with the present invention.

With reference next to FIG. 2, one embodiment of the control system 18 suitable for use with the present invention is illustrated in functional block diagram form. The control system 18 can be realized as part of the overall liquid gauging system electronics, or can be provided as a separate stand alone control system as required. The control system 18 includes a controller 50, in this case a microprocessor controller, which is programmed to execute the various control functions described herein, as well as others as required for a particular application. The controller 50 provides timing control signals to a burst generator 52, which can be realized in the form of a 1 megahertz, for example, signal generator. The controller 50 also provides a burst length control signal 54 so that the controller 50 can vary the number of sinusoidal cycles transmitted with each excitation. In the described embodiment, the controller 50 can command burst lengths of 1, 2, 4 and 8 cycles. A MUX circuit 56 is addressed by and used by the controller 50 to selectively energize each of the ultrasonic probe transducers 12, in this case eight transducers are controlled by the controller 50.

The transducers 12 are used to both transmit and receive ultrasonic energy, and the controller 50 uses the MUX circuit 56 to selectively couple the analog receive echo signals to an amplifier and detector circuit 58. The amplifier and detector circuit 58 can be conventional in design and typically includes a bandpass filter (in this case at 1 megahertz) and an envelope detector. A signal conditioning circuit 60 can be used as required to convert the output from the amplifier and detector circuit 58 into a digital pulse waveform that is compatible for storing the echo data in a FIFO (first in first out) digital memory 62. The echo data is stored in the FIFO memory in the form of a count from a counter 64 that is controlled by the controller 50. At the occurrence of the leading edge of each echo pulse 66, a count value is stored in the FIFO memory in the same temporal order that each echo is received. The stored count value corresponds to the time of arrival of the respective echo. A count value corresponding to the time $t_1$ of the leading edge of the transmit pulse is also loaded into the FIFO memory 62. The FIFO is cleared prior to each transmit event.

Figure 3:
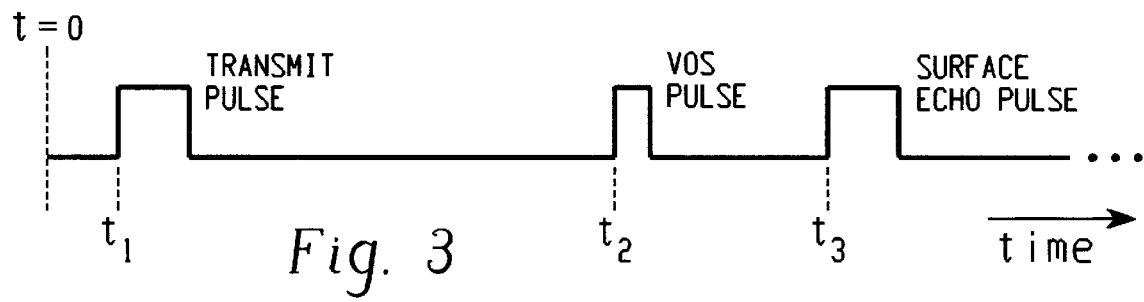
FIG. 3 is a typical time line showing the timing relationships between transmit and receive pulses when the liquid is above the VOS target.

FIG. 3 illustrates a typical time line for detected echoes under conditions in which the liquid level is above the VOS target. At time $t_1$ the controller 50 excites the respective transducer 12 and the ultrasonic energy transmit pulse is emitted into the liquid. The time $t_1$ is stored in the FIFO memory 62 as a count value CNT1 ($t_1$=CNT1*0.5 microseconds). At time $t_2$ the leading edge of the echo from the VOS target 24 is detected and the this time is stored in the FIFO memory 62 as a count value CNT2. At time $t_3$ the leading edge of the liquid surface echo is detected and this time is stored in the FIFO 62 as a count value CNT3. The VOS pulse is typically 10 microseconds which in the present embodiment corresponds to a pulse width of 20 counts, and a typical surface echo may be 40 to 60 microseconds which in this embodiment corresponds to a pulse width of 80 to 120 counts (wherein one count=0.5 microseconds). Although not shown, additional secondary and tertiary echoes may be received from the target and the surface but these echoes can be ignored since valid echoes are earlier received.

In addition, the VOS target 24 and the fluid surface S can have secondary or even tertiary echoes which can appear and may be loaded by the FIFO memory 62. Still further, if CNT3 or CNT3 and CNT2 are not present or not detected, no corresponding count is loaded into the FIFO memory 62 for such missed echoes. When the FIFO memory 62 thereafter is read, it will simply supply the last valid value clocked into the memory 62. For example, if the surface echo is not detected, CNT3 fails to appear and no value is stored therefor in the memory 62. When the FIFO memory 62 thereafter is read, the output will be:

CNT1, CNT2, CNT2

Similarly, if CNT2 and CNT3 fail to appear (e.g. no target echo and no surface echo detected), then the output from the FIFO memory 62 will be:

CNT1, CNT1, CNT1.

Note that for the described embodiment herein a typical actual distance of the VOS target 24 to the transducer face 14 is 7.21" and the maximum measurable fluid height in this application is approximately 13". These values are intended to be exemplary in nature and will vary depending on each particular application of the invention.

Figure 4A:
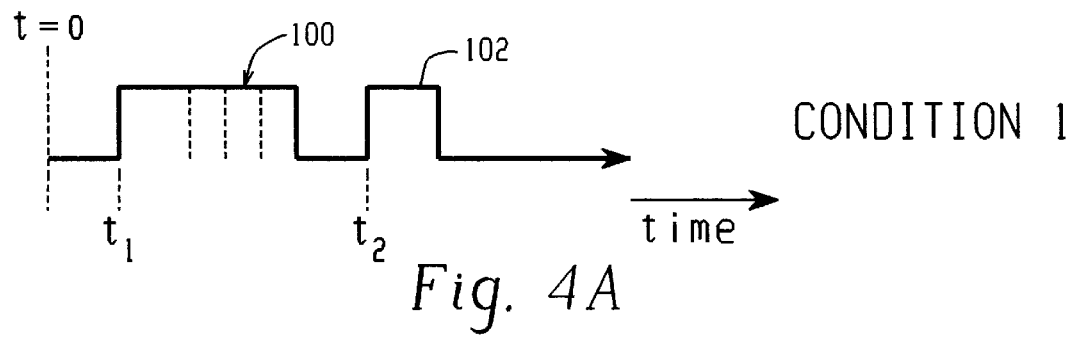
FIGS. 4A–4C are typical time lines showing various pulse conditions that can occur under low liquid level conditions.
Figure 4B:
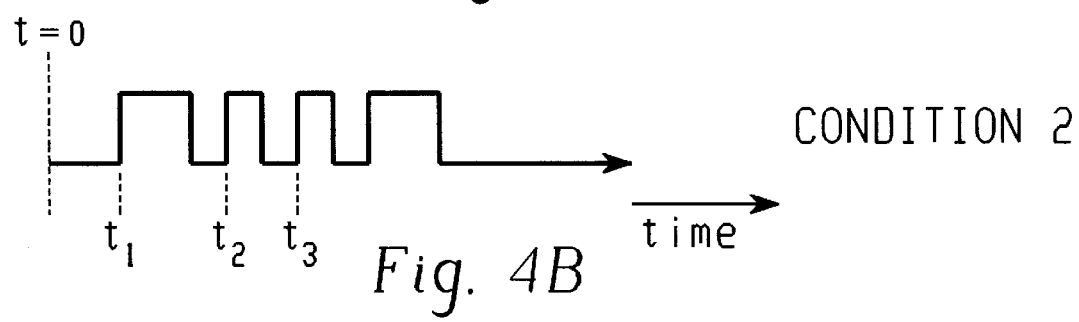
Figure 4C:
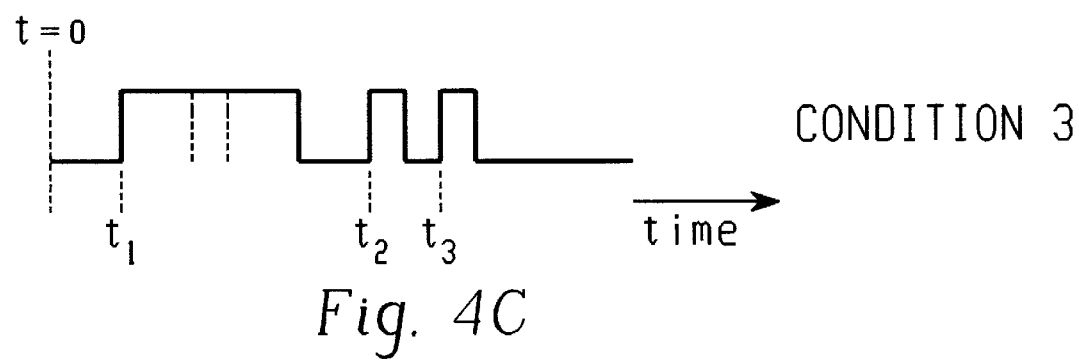

Under low liquid level conditions, for example on the order of only a few inches between the transducer face 14 and the liquid surface, not only is there no target 24 echo, but there may well be multiple or harmonic echoes from the surface. These conditions are illustrated in the time lines of FIGS. 4A–4C (note that in FIGS. 4A–4C and FIG. 5 that dashed lines are used to show "hidden" edges of pulses that are combined into single pulses). Condition 1, FIG. 4A, occurs when several harmonic surface echo pulses are present and combine to form a long continuous pulse 100 with one non-combined higher order harmonic pulse 102 at the end. Thus, the FIFO memory 62 is clocked only twice at t1 and t2. With only two available pulses, it is virtually impossible to extract the correct fuel level from this data and therefore it is discarded. This can be detected as a CNT2=CNT3 condition in the FIFO data. If CNT2≠CNT3, then a valid t3 exists and a precise or reasonably averaged fuel level can be found since either condition 2 (FIG. 4B) or condition 3 (FIG. 4C) exists at this point. Under condition 2, t3 represents the actual fuel surface times two since it is known that the liquid surface is below the VOS target and t3 must therefore be the secondary fuel echo. Under condition 3, t3 represents a higher order surface echo harmonic which can thus be halved to achieve an averaging affect. Since conditions 2 and 3 are transitory in nature and rarely persist for more than one or two data samples, an averaging routine can take out most of the jitter typically encountered when the fuel level is near the transducer. Without this routine, the measured low fuel level can vary radically and jump to values of four to five times the actual level. Implementation of this aspect of the invention will be described in greater detail hereinafter.

Figure 5:
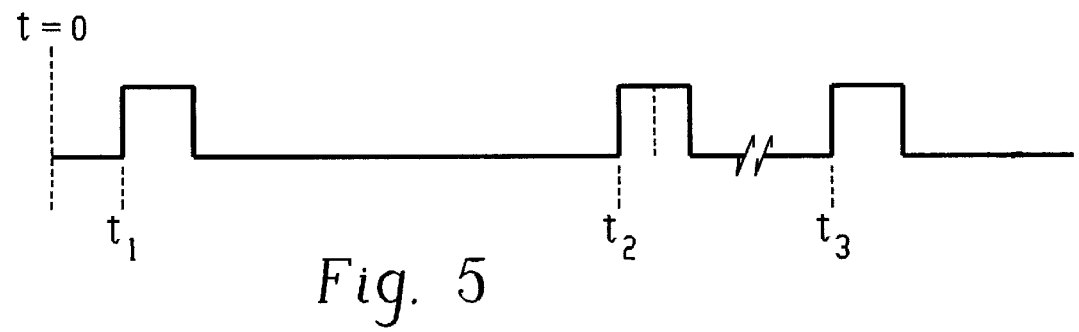
FIG. 5 is a typical time line for echo pulses in which the second echo pulse occurs at a time that is approximately twice the time of occurrence of the first echo.

FIG. 5 illustrates another echo condition that can arise. In this case, the first echo at $t_2$ occurs at approximately one-half the time of the second echo at time $t_3$. Under such circumstances, either the VOS echo and the primary surface echo (i.e. the first surface echo) have combined or the liquid surface is below the target and the echoes at $t_2$ and $t_3$ are primary and first harmonic echoes from the surface and an averaging technique can again be used as described hereinafter.

Figure 6A:
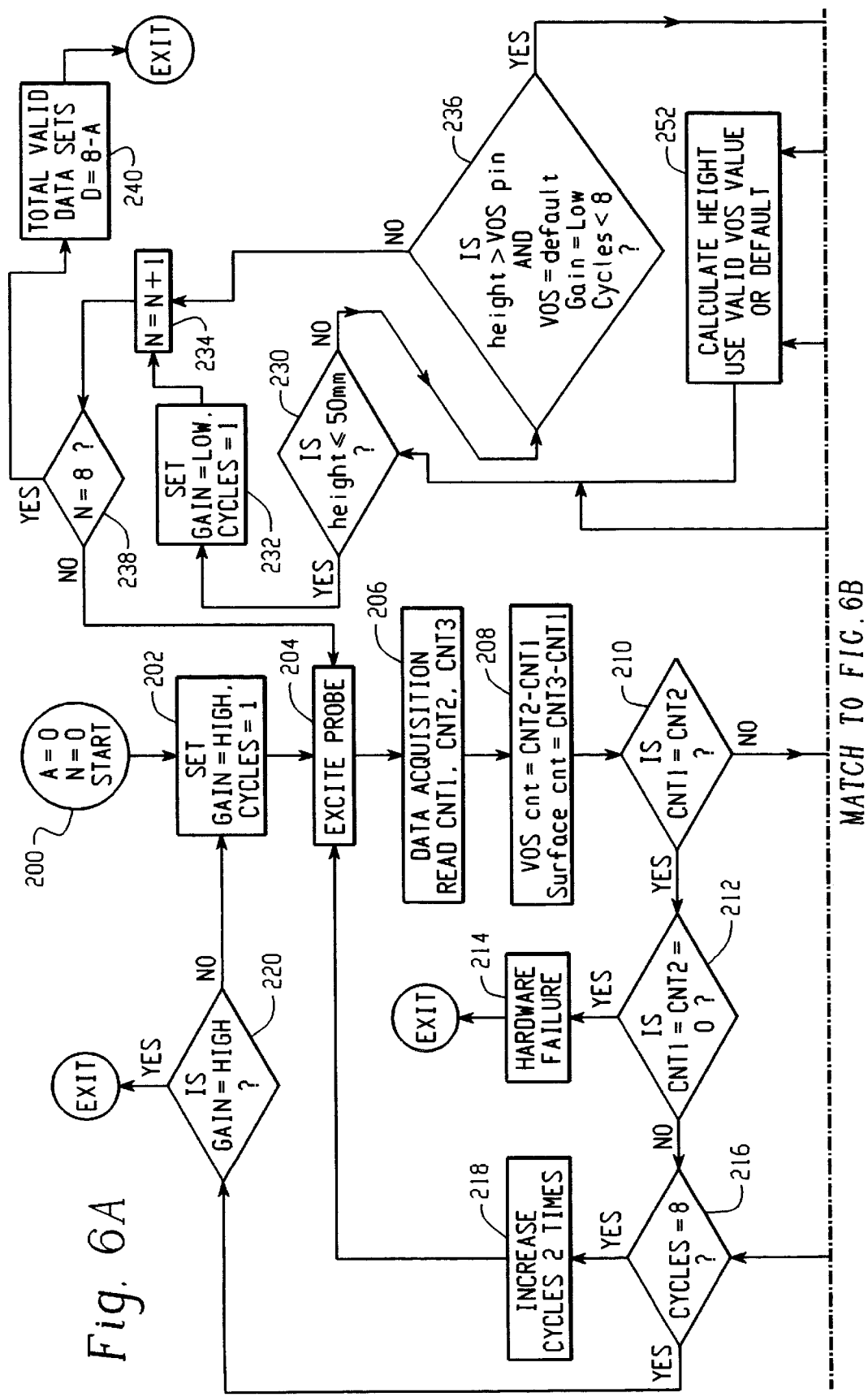
FIGS. 6A and 6B are a flow diagram for a control algorithm useful with the apparatus of FIGS. 1 and 2 that incorporates the present invention.
Figure 6B:
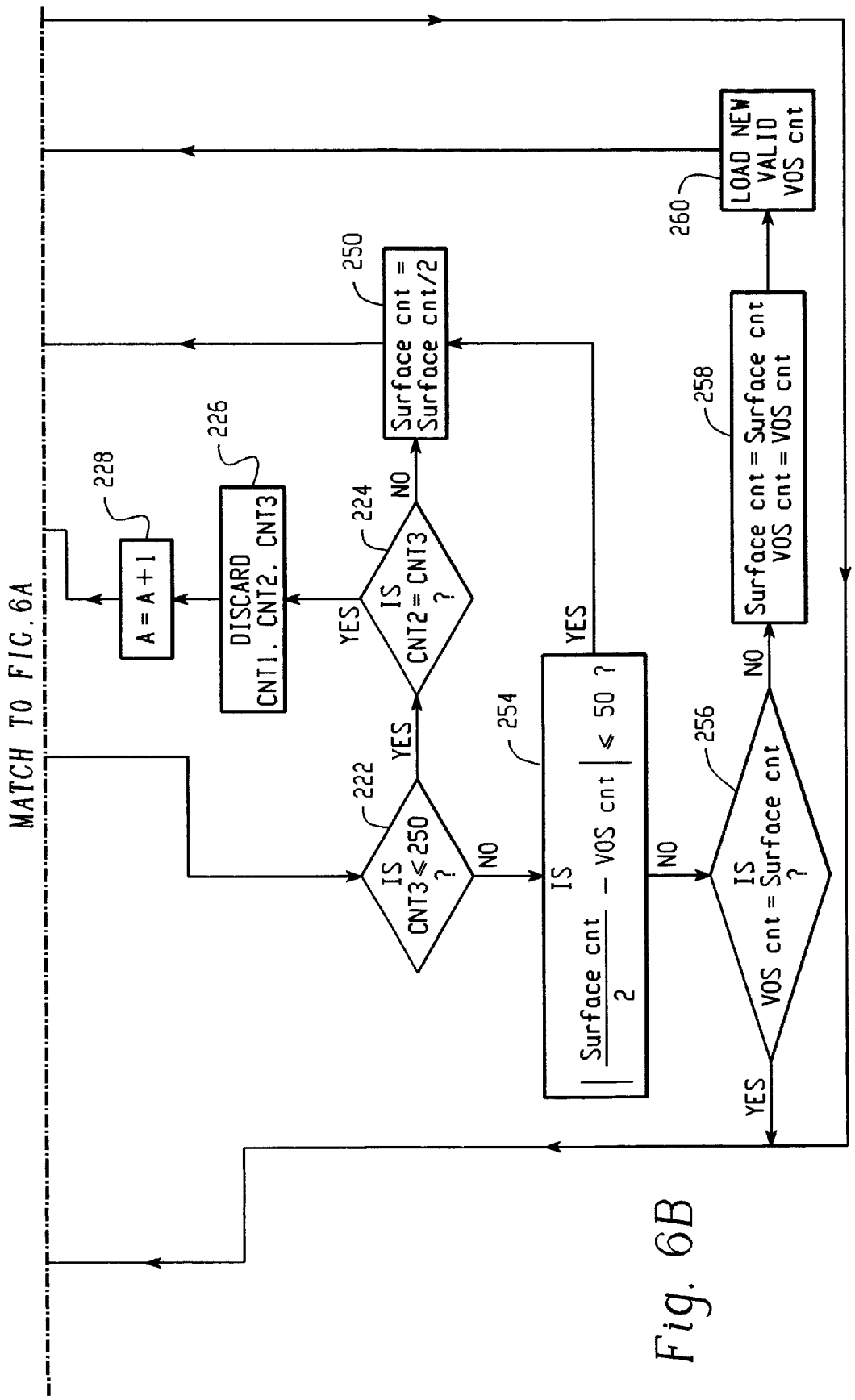

Referring next to FIGS. 6A and 6B, a suitable liquid gauging control algorithm that implements the various aspects of the present invention is illustrated. This algorithm is realized in software, in this case, as part of the controller 50 operating program.

The control algorithm starts at step 200 with two counters "A" and "N" set to zero value. At step 202 the initial system gain is set at HIGH. This gain value can refer to either the receiver circuitry gain sensitivity, the transmit gain level (e.g. transmit power) or both, depending on the particular application. Also at step 202 the number of transmit cycles, in this case one, can be set to a preferred initial value.

At step 204 the selected probe is excited by application of the ultrasonic excitation signal, and the ultrasonic energy is transmitted into the liquid toward the liquid surface. Step 206 represents the data acquisition period in which the echoes are detected, if any, and converted to the CNT1, CNT2 and CNT3 values that are stored in the FIFO memory 62 and thereafter read out of the FIFO by the controller 50.

At step 208 the VOS cnt and Surface cnt values are calculated as set forth hereinabove.

At step 210 the program checks whether CNT1=CNT2. If the result is YES, this indicates that either no echoes were received or a hardware failure has occurred. The program proceeds to step 212 and checks if CNT1=CNT2=0. If the result is YES, then a hardware failure is indicated at step 214 and the program exits. If the result at step 212 is NO, then the system checks at step 216 whether the number of transmit cycles is the maximum, in this case eight. If not, then at step 218 the controller 50 increases the number of transmit cycles by two, and returns to step 204 to re-excite the probe transducer. Thus, assuming a hardware failure is not indicated, the system attempts to obtain valid echoes by increasing the number of transmit cycles up to a predetermined number.

If at step 216 the maximum number of transmit cycles has been attempted, then at step 220 the program checks if the system gain is at HIGH. If the result is NO, the program returns to step 202, sets the gain to HIGH and again excites the transducer in an attempt to obtain valid echoes. If the result at step 220 is YES, then the system has reached its maximum gain and transmit cycle attempts without having obtained valid echoes. Accordingly, the system exits the program as valid echo data cannot be obtained. At this point, prior to exiting, the system could execute diagnostics routines or other self-tests if required in an attempt to determine the cause of the inability to obtain valid echoes, e.g. the system could perform diagnostics tests on the signal processing circuits to determine if there is a hardware failure.

If the result at step 210 is NO, the program advances to step 222 and checks whether the CNT3 value is less than or equal to 250, which value corresponds to a liquid surface distance of about three inches above the transducer face 14. If the result at step 222 is YES, then the system checks at step 224 whether CNT2=CNT3. If the values are equal, this corresponds to condition 1 represented in FIG. 4A described above, and the data is discarded at step 226 because only one echo has been received and the surface distance is thus indeterminate. At step 228 the A counter is incremented one value and at step 230 the height calculation is checked to see if the liquid surface height is less than or equal to a predetermined value, in this case fifty millimeters. If YES, the gain is set to low at step 232, and the N counter is incremented by one at step 234. If at step 230 the result is NO, the program advances to step 236 and checks whether the calculated height is above the VOS target, the VOS value is a default value (indicating loss of target echo), and whether the gain is set low and the number of transmit cycles is less than the maximum (in this case eight). If the result is NO at step 236, then the N counter is incremented at step 234, and at step 238 the program checks whether N=8 and if YES calculates the total number of valid data sets D=8−A at step 240 and then exits. If N is not equal to eight at step 238, then the system returns to step 204 and again excites the transducer 12.

If the result at step 236 is YES, then the program returns to step 216 in order to increase the number of transmit cycles and/or gain in an effort to detect valid echoes from the target. Note that the discarded data at step 226 only represents one data acquisition cycle out of a number of attempts N (in this case eight). Loss of data from one transmit/receive cycle does not necessarily invalidate the other data sets obtained during previous or subsequent excitations of the same transducer 12.

If at step 224 the result was NO, this indicates either condition 2 (FIG. 4B) or condition 3 (FIG. 4C) is present. Under such circumstances, the CNT3 value represents a valid harmonic echo (e.g. a secondary echo) from the surface. Therefore, at step 250, the Surface cnt value is divided by two to obtain an accurate average reading for the Surface cnt value, and at step 252 the liquid surface height is calculated 15 based on Eqn. 1 above. The VOS cnt value used to calculate the height h at step 252 is the present VOS cnt value if available, or a VOS value from another probe, or a default value. The program then advances to step 230 and continues as described hereinabove.

At step 222, if the result was NO, then at step 254 the system checks whether half of the Surface cnt value is within a preselected value (in this case fifty) of the VOS cnt value. This calculation may be done on an absolute value determination of the difference between one-half of the Surface cnt value and the VOS cnt value. It YES, this corresponds to the condition illustrated in FIG. 5 in which the VOS target echo might be being obscured by a true surface echo, or the echoes are primary and secondary returns from the surface with the surface below the VOS target 24. Under such circumstances, the Surface cnt value actually represents a secondary echo from the surface, so the an average value of (Surface cnt)/2 can be used to approximate the liquid surface height, as at steps 250 and 252.

If the result at step 254 is NO, then at step 256 the program checks whether the VOS cnt value is equal to the Surface cnt value (i.e. CNT3=CNT2). If the result is YES, then the system knows that only one echo was detected, and the program advances to step 216 to increase the number of transmit cycles and/or gain to obtain a valid second echo. If the result at step 256 is NO, then the system knows that the condition of FIG. 3 exists, with a valid VOS target 24 echo and a valid primary echo from the liquid surface. Accordingly, at step 258 the VOS cnt and Surface cnt values are updated and stored, and at step 260 the VOS cnt value is retained as the most recent valid data indicating VOS. The system then advances to step 252 and proceeds as described hereinbefore.

If the result at step 256 is YES, then this indicates that either the primary surface echo was not detected for a surface level that is above the VOS target 24, or the secondary surface echo was not detected for a surface level that is below the VOS target 24. Under this condition, no assumptions can be made about whether the CNT2 value represents a VOS target echo or a primary surface echo. Therefore, the system returns to step 216 and increases the transmit power and/or gain in an attempt to detect two valid echoes.

The algorithm of FIGS. 6A and 6B thus provides decision criteria for accepting or rejecting echo data for low liquid levels which levels can result in harmonic echoes from the surface without an echo from the target. The invention thus allows echo discrimination and height calculation based on simply the use of counter values loaded into a memory in response to detected echoes, and for detecting when echoes are missing or harmonic echoes are present so as to permit average count values to be used to prevent erratic calculated height variations.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. Method for processing echoes received in an ultrasonic liquid gauging apparatus, the method comprising the steps of:
   a) transmitting at time $t_1$ ultrasonic energy from an ultrasonic transducer toward a fixed target and a liquid surface, said target being a known distance from said transducer;
   b) producing a transmission pulse corresponding to the time $t_1$;
   c) receiving during a predetermined cycle interval a number (i) of at least two ultrasonic echoes after $t_1$ and converting each echo into a corresponding echo pulse having an associated time of arrival $t_{i+1}$;
   d) identifying that the liquid surface is low based on times of arrival of said received echoes; and
   e) calculating from velocity of sound and echo arrival time said low liquid level based on time of arrival of at least one of said received echoes relative to $t_1$.

2. The method of claim 1 wherein the step of calculating the liquid level is based on an averaged time of arrival of the second echo when it is indeterminate that the liquid surface is below the target.

3. The method of claim 2 comprising the step of determining when the second echo time of arrival $t_3$ is approximately twice the first echo time of arrival $t_2$, and under such conditions using the value $t_3/2$ to calculate the liquid level.

4. The method of claim 1 wherein the first echo is a primary surface reflection of the ultrasonic energy and the second echo is a harmonic surface reflection so that the value $t_3/2$ corresponds to the liquid level.

5. The method of claim 1 wherein the first and second echoes are harmonic surface reflections so that the value $t_3/2$ can be used as a valid approximation of the liquid level.

6. The method of claim 1 wherein the liquid level is determined based on an average velocity of sound (VOS) value or a previously determined VOS value.

7. The method of claim 1 comprising the steps of:
   e) storing the transmission pulse time $t_1$ and each echo pulse time $t_i+1$ in a memory device based on the time of arrival of the pulses, wherein liquid level is determined based on the time of arrival of the echo pulses relative to the time $t_1$, and velocity of sound (VOS) is determined based on the time of arrival of an echo from the target when the liquid level is above the target.

8. The method of claim 1 comprising the steps of:
   e) determining when the number of distinct echo pulses received after time $t_1$ during said interval is less than two; and
   f) discarding echo data when less than two echoes are received during said interval.

9. The method of claim 8 comprising the step of exciting the transducer a subsequent number of excitation cycles during a corresponding number of said predetermined cycle intervals to produce at least two echoes after the time $t_1$, wherein during each subsequent excitation cycle the number of high frequency cycles of the ultrasonic energy is increased in a predetermined manner.

10. The method of claim 9 comprising the step of increasing receiver gain to a high value during said subsequent excitation cycles.

11. The method of claim 1 comprising the step of determining when a second echo time of arrival, $t_3$, occurs within a second time interval corresponding to a predetermined low liquid level below the target.

12. The method of claim 11 wherein for low liquid levels near the transducer transmitting face, single cycle excitations of the transducer are used and transmitter and/or receiver gain is reduced relative to a high gain condition used to detect weaker echoes.

13. The method of claim 1 wherein for liquid levels above the target determined using a default VOS value, the number of transmit cycles and gain are increased to obtain a valid echo from the target.

* * * * *